US010740786B2

(12) United States Patent
Buchalter et al.

(10) Patent No.: US 10,740,786 B2
(45) Date of Patent: Aug. 11, 2020

(54) SYSTEMS, METHODS AND PROGRAMMED PRODUCTS FOR DYNAMICALLY TRACKING DELIVERY AND PERFORMANCE OF DIGITAL ADVERTISEMENTS IN ELECTRONIC DIGITAL DISPLAYS

(71) Applicant: Intersection Parent, Inc., New York, NY (US)

(72) Inventors: Yehuda Ari Buchalter, Forest Hills, NY (US); Kshitij Sharma, Searingtown, NY (US); Jason Shao, Pocono Pines, PA (US); William T. Maslyn, Poughkeepsie, NY (US); Nitin Shriram, Edison, NJ (US)

(73) Assignee: Intersection Parent, Inc., New York, NY (US)

( * ) Notice: Subject to any disclaimer, the term of this patent is extended or adjusted under 35 U.S.C. 154(b) by 0 days.

(21) Appl. No.: 16/054,516

(22) Filed: Aug. 3, 2018

(65) Prior Publication Data
US 2019/0043080 A1 Feb. 7, 2019

Related U.S. Application Data

(60) Provisional application No. 62/541,313, filed on Aug. 4, 2017.

(51) Int. Cl.
*G06Q 30/02* (2012.01)
(52) U.S. Cl.
CPC ..... *G06Q 30/0245* (2013.01); *G06Q 30/0201* (2013.01); *G06Q 30/0204* (2013.01); *G06Q 30/0272* (2013.01)

(58) Field of Classification Search
USPC .......................................... 705/14.46, 58, 71
See application file for complete search history.

(56) References Cited

U.S. PATENT DOCUMENTS

| | | | |
|---|---|---|---|
| 8,437,776 B2 | 5/2013 | Busch | |
| 8,983,859 B2 | 3/2015 | Nice et al. | |
| 2009/0012867 A1 | 1/2009 | Lerman et al. | |
| 2009/0012868 A1 | 1/2009 | DeAngelis | |
| 2009/0198579 A1 | 8/2009 | Lewis et al. | |
| 2009/0217315 A1 | 8/2009 | Malik et al. | |
| 2009/0265243 A1 | 10/2009 | Karassner et al. | |
| 2012/0010956 A1* | 1/2012 | Ramer ............ | G06Q 30/02 705/14.46 |
| 2012/0030034 A1 | 2/2012 | Knapp et al. | |

(Continued)

FOREIGN PATENT DOCUMENTS

WO 2013016214 A1 1/2013

OTHER PUBLICATIONS

International Search Report and Written Opinion dated May 24, 2019 issued in PCT/US2019/022268.

(Continued)

*Primary Examiner* — Saba Dagnew
(74) *Attorney, Agent, or Firm* — Amster, Rothstein & Ebenstein LLP

(57) ABSTRACT

Systems and methods for dynamically tracking delivery and performance of digital advertising placed on non-personal devices in physical locations and integrating, displaying, and reporting impressions and events in digital advertising systems.

14 Claims, 8 Drawing Sheets

(56) References Cited

U.S. PATENT DOCUMENTS

| | | |
|---|---|---|
| 2013/0137463 A1 | 5/2013 | Busch |
| 2015/0046269 A1* | 2/2015 | Liu .......................... G06F 3/14 705/14.71 |
| 2015/0235275 A1 | 8/2015 | Shah et al. |
| 2016/0125466 A1* | 5/2016 | Kulkarni ............. G06F 3/04883 705/14.58 |
| 2017/0103428 A1 | 4/2017 | Saifee et al. |
| 2017/0161793 A1 | 6/2017 | Knapp et al. |

OTHER PUBLICATIONS

Non-Final Office Action dated May 17, 2019 in U.S. Appl. No. 16/353,550, filed Mar. 14, 2019, related case.
International Search Report and Written Opinion—International Application No. PCT/US2018/45251 dated Oct. 10, 2018.

\* cited by examiner

SYSTEMS, METHODS AND PROGRAMMED PRODUCTS FOR DYNAMICALLY TRACKING DELIVERY AND PERFORMANCE OF DIGITAL ADVERTISEMENTS IN ELECTRONIC DIGITAL DISPLAYS

RELATED APPLICATIONS

This application is a non-provisional based on and claiming priority to U.S. Provisional Application No. 62/541,313, filed Aug. 4, 2017 and entitled SYSTEMS, METHODS AND PROGRAMMED PRODUCTS FOR DYNAMICALLY TRACKING DELIVERY AND PERFORMANCE OF DIGITAL ADVERTISEMENTS IN ELECTRONIC DIGITAL DISPLAYS, the contents of which are incorporated herein by reference in their entirety.

FIELD

The present invention generally relates to systems and methods for dynamically tracking the delivery and performance of digital advertising placed on non-personal devices in physical locations, and integrating, displaying, and reporting impressions and events in conventional digital advertising systems.

BACKGROUND

A significant and robust market exists for marketing digital advertisements on various types of personal computing devices, like computers (desktop and laptop), mobile phones and tablets, and traditional browser-based devices operated by a consumer who is the user of the device. Conventional advertisement tracking systems and methods which were built for personal devices rely on device identification systems and methods to create a record in buyer advertising systems representing showing a digital advertisement ("ad") to a consumer (the "impression"), and on which personal device a consumer, who was exposed to the impression, took some action (the "event") in response to the impression (e.g., visiting a website, making an online purchase, calling a telephone number in response to the advertisement, to name a few.). In many cases, the impression and event occur on the same personal device, with a unique identifier such as a cookie or device ID serving as the basis for linking the impression and event on that device. In other cases, the impression and event occur on different personal devices that are used by the same consumer (or an associated consumer, like a family member) and linked by a common identifying signal across devices (e.g., a hashed login ID used on both devices) that unified the device-specific identifiers. Thus, conventional tracking systems allow buying parties to automatically track impressions delivered on personal devices (to measure campaign delivery) and link impressions to events occurring on personal devices (to measure campaign performance), for a particular advertisement and campaign.

At the same time, the same or related digital advertisements (e.g., part of the same campaign) may be placed in other network-connected digital display systems (such as the outdoor display 10 illustrated in FIG. 1, as discussed below) which are not personal computing devices ("non-personal devices"). The defining characteristic of personal devices is that they are used by only one individual (or some very small number of individuals, e.g., in a household) who regularly use the device, and therefore digital advertisements shown on these devices are seen only by the individual(s) in question. By contrast, digital advertisements shown on non-personal devices are generally seen by many different people, who have no unique or persistent association with those devices. In addition, with personal devices, the events (such as purchases, etc.) that occur in response to an impression usually occur on the same personal device as the impression, or on another device that can be associated to the same user (or associated users) by the means described above. By contrast, events occurring in response to an impression on a non-personal device usually occur on a different device, and most commonly a personal device (e.g., using a personal device such as a mobile phone to visit a website, scan a QR code, or text a number that is displayed in the advertisement, to name a few). For these reasons, conventional identification and tracking systems and methods (e.g., using cookies and device IDs) to link impressions and events do not work.

These technical differences create technological barriers to using the same integrated methods and systems used in the conventional art to track impressions and events (e.g., so-called ad serving systems, demand-side platforms, etc.) for digital advertisements on personal devices, from being used to track impressions and events for digital advertisements on non-personal devices.

What is needed is an improved system and method by which buyers of digital advertising can place the digital advertisements in both personal devices and non-personal devices, while still allowing dynamic, real-time tracking of the delivery and performance of the digital advertisements as placed in each type of device.

SUMMARY

The present invention addresses this and other problems with new and improved systems and methods for dynamically tracking the delivery and performance of digital advertising placed on non-personal devices in physical locations and integrating, displaying, and reporting impressions and events in traditional digital advertising systems.

A method according to an exemplary embodiment of the present invention comprises:

(a) receiving, from a first electronic display at a first location, by a distribution platform, first electronic ad play data comprising a first device identifier associated with the first electronic display and a first time-stamp associated with a first digital advertisement displayed during a first time period at the first electronic display at the first location;

(b) storing, by the distribution platform on first non-volatile computer readable memory operatively connected to the distribution platform, the first electronic ad play data in an impression database stored on the first non-volatile computer readable memory;

(c) determining, by the distribution platform, a first number N of impressions associated with a number of individuals estimated to have viewed the first digital advertisement during the first time period at the first location;

(d) for each of the N impressions, performing by the distribution platform the following steps: [1] obtaining, by the distribution platform, from non-volatile computer readable memory operatively connected to the distribution platform, an impression pixel tag as obtained from a buyer demand side platform associated with the first digital advertisement; [2] generating, by the distribution platform, a virtual session identified by a UID associated with the impression; [3] sending, by the distribution platform to the buyer demand side platform, an impression pixel call containing information associated with the virtual session; [4] receiving, by the distribution platform from the buyer demand side platform, an impression identifier to recognize a device on future calls corresponding to the received impression pixel call; and [5] storing, by the distribution platform, the received impression identifier against the UID as associated with the virtual session;

(e) receiving, at the distribution platform, from a first personal device associated with a first individual responding to the advertisement, a first electronic event;

(f) attributing, by the distribution platform, the first electronic event with a first impression by performing the steps comprising: [1] obtaining, by the distribution platform from non-volatile computer readable memory operatively connected to the distribution platform, an event pixel tag as obtained from the buyer demand side platform associated with the first electronic event; [2] matching the first electronic event with the first digital advertisement by comparing one or more of the following: i) the first electronic event with an identifying code string associated with the first digital advertisement; ii) time of the first electronic event with the first time-stamp associated with the first digital advertisement; iii) location of the first personal device at time of the first electronic event with the first location of the first electronic display; iv) characteristics of the first electronic event and previously recorded impressions using statistical modeling; [3] associating, by the distribution platform, the matched first electronic event with the first impression; [4] obtaining, by the distribution platform, from non-volatile computer readable memory operatively connected to the distribution platform, a corresponding UID and virtual session; and [5] transmitting, by the distribution platform, the event pixel tag with the corresponding stored information from the virtual session, including any impression identifier information previously received from the buyer demand platform, to the buyer demand side platform to record the first electronic event.

In an exemplary embodiment, the determination of the first number N of virtual impressions is performed by the steps comprising:

[1] accessing a geolocation database comprising geolocation data which identifies a number of estimated viewers for a specified location at a specified time of day for a specified day of week as an impression multiplier; and

[2] matching the first ad play data with the impression multiplier to identify the first number N.

In an exemplary embodiment, the determination of the first number N of virtual impressions is performed by the steps comprising:

[1] using sensors to estimate the number of viewers exposed by a specific device at a point in time as an impressions multiplier;

[2] matching the first ad play data with the impression multiplier to identify the first number N.

In an exemplary embodiment, the sensors are associated with one or more of the following: network traffic, cameras, audio and pressure sensors. In the case of pressure sensors, the sensors may detect atmospheric pressure (e.g., displacement), or may be pressure plates (e.g., sensors typically in floors or buried in pavement to detect pressure exerted by objects.

In an exemplary embodiment, the first electronic event is sent via a redirect from a custom URL before the personal device is sent to an advertiser URL.

In an exemplary embodiment, the first electronic event is received from a communication service 80 indicating that a telephone call was made to a call-tracking telephone number associated with the advertisement.

In an exemplary embodiment, the first electronic event is from a communication service 80 indicating receipt by an SMS sent to a number associated with the first electronic advertisement.

In an exemplary embodiment, the first electronic event is from a communication service 80 indicating a social media post with a unique hashtag or other identifying label was made, associated with the first electronic advertisement.

In an exemplary embodiment, the first electronic event is from a computer system indicating an email was received at a unique designated email address, associated with the first electronic advertisement.

In an exemplary embodiment, the first electronic event is from a computer system indicating receipt of a unique coupon code associated with the first electronic advertisement.

In an exemplary embodiment, the first electronic event is from a computer system indicating receipt of a unique QR code associated with the first electronic advertisement.

In an exemplary embodiment, the information associated with the virtual session comprises one or more of the following: a virtual device-id, virtual user-agent, virtual location, virtual IP address, virtual credentials (shared secrets, identifiers, hashes, username/passwords, PKI credentials) and any other information that allows the distribution system to emulate a web browser or mobile device digitally sending tracking information with a buyer digital platform.

In an exemplary embodiment, the impression identifier comprises one or more of the following: cookies returned by buyer digital platform such as: DSP id, campaign id, visit history, displayed ad id, headers, caching control information, API response content, status code, and other information for identification and tracking returned by the buyer digital platform designed to be persisted by a web browser, API client, or other connected device.

In an exemplary embodiment, the buyer demand side platform is associated with one or more external advertiser tags, and for each of the N impressions, the distribution platform repeats steps (d)[1] through (d)[5] mentioned above for each of the one or more external advertiser tags.

BRIEF DESCRIPTION OF THE DRAWINGS

Exemplary embodiments of the present invention will be described with references to the accompanying figures, wherein.

DETAILED DESCRIPTION

The present invention generally relates to systems and methods for dynamically tracking delivery and performance of digital advertising placed on non-personal devices in physical locations and integrating, displaying, and reporting impressions and events in conventional digital advertising systems.

As discussed above, the present invention seeks to address the computer problem of how to track and communicate advertising delivered internet-enabled devices which are not personal devices, and match "impressions" (digital records of the display of an advertisement to an individual) and "events" (consumer actions taken in response to the impressions) on personal devices, in a manner that can be easily integrated into conventional advertising systems (e.g., ad serving systems and demand-side platforms) that currently enable campaign measurement, reporting, attribution, optimization and other functions in cases where impressions and events both occur on personal devices.

In exemplary embodiments, the present invention solves this technical challenge by implementing a physical-to-digital adaptor technology that makes an unconventional and non-routine use of phantom device tracking identifications that allow for dynamic and real-time tracking of impressions delivered to a non-personal device and corresponding events generated from a personal device. In embodiments, the present invention can be implemented in and integrated into conventional digital advertising systems without requiring such systems to be modified. Despite a long-felt need to correlate impressions on a non-personal device with events on a personal device, to date, such a solution has not been realized.

Figure 2:
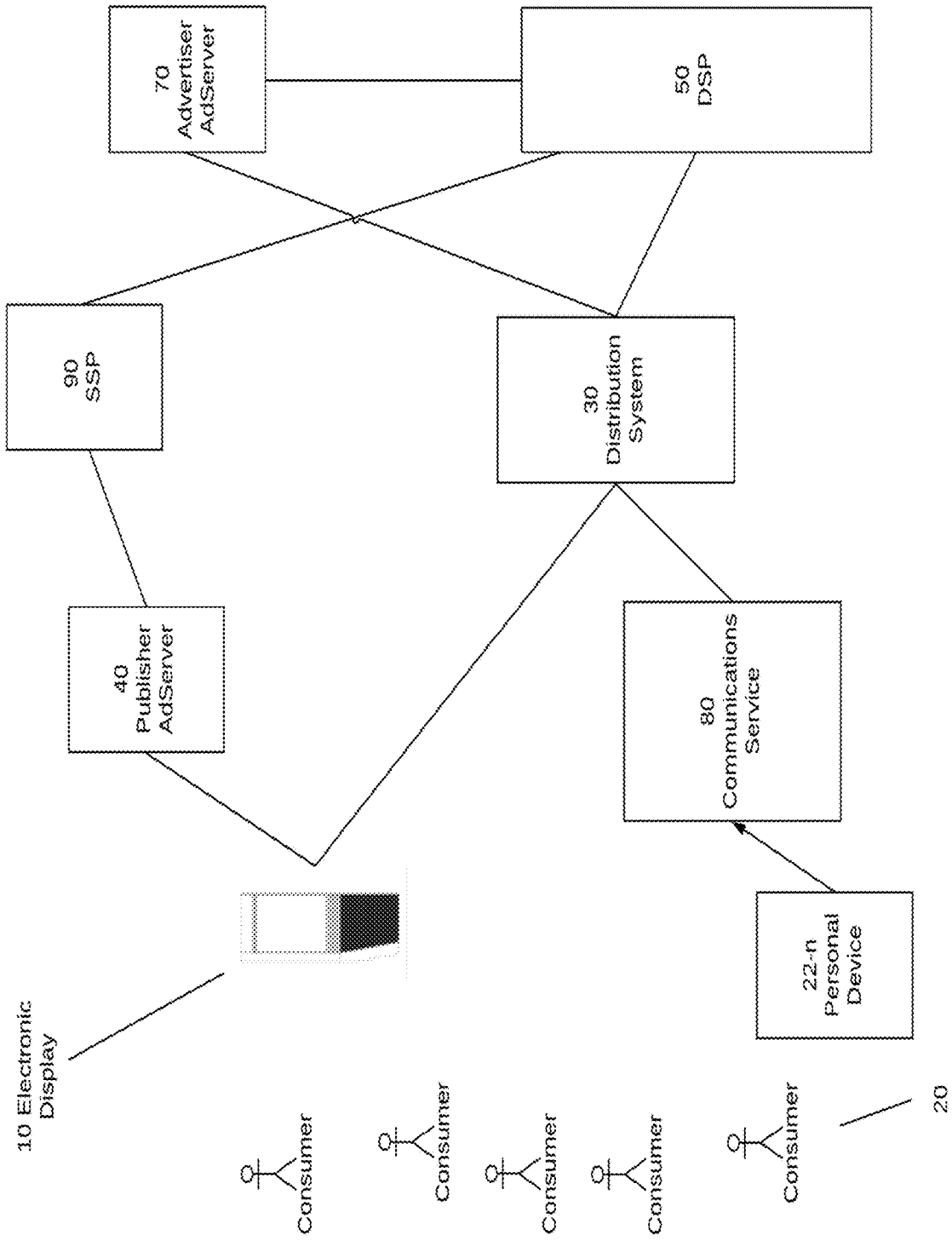
FIG. 2 illustrates an exemplary configuration of participant systems and platforms in accordance with exemplary embodiments of the present invention.

In accordance with exemplary embodiments of the present invention, a distribution platform 30 (as illustrated in FIG. 2 for example), automatically logs "ad plays" (e.g., advertisements shown to consumers on non-personal devices), and events (from personal devices) translates them to impressions and events that match the interfaces used in conventional digital advertising.

In accordance with exemplary embodiments of the present invention, the distribution system can perform one or more of the following functions:

1. Automatically associate advertising delivered on non-personal devices and consumer responses on personal devices to advertising campaigns set up in traditional digital advertising systems, registering corresponding impression and event tracking endpoints.
2. Expose an Application Programming Interface "API" to digitally record advertising plays, defined as instances of a digital advertisement appearing on a non-personal device (which may be seen by multiple consumers).
3. Automatically translate plays into impressions to infer the number of consumers who were exposed to an individual ad play. The algorithm for estimating impressions may factor in data from measurement companies (e.g., GeoPath, Root, Neustar, to name a few), network traffic, location signals of nearby personal devices, computer vision analysis of camera feeds, data from beacons, other inputs from onboard sensors, or other sources.
4. Create a virtual session, and unique session identifier (UID) for each of these recorded impressions.
5. Emulate a web browser or mobile client to create proxy requests to record impressions in digital advertising systems, recording cookies, headers, and other technical identifiers returned via HTTP responses and persisting them to records associated with the created virtual session into non-volatile memory on a distribution platform (such as the distribution platform 30 shown in FIGS. 2 and 4-6, to be discussed in detail below).
6. Expose an Application Programming Interface "API" to digitally record events using special-built adapters across a variety of communication channels through which consumers may respond on a personal device to an advertisement on non-personal device: e.g., webpage visits, text messages, emails, social media posts, scanning quick response codes, phone calls, to name a few.
7. Associate received events with a previously created virtual session using a variety of heuristics: e.g., device graph correlation, geospatial proximity, predictive modeling, to name a few.
8. Emulate a web browser to create proxy requests to record "events" in digital advertising systems, replaying cookies and other stored information from the virtual session to allow the digital advertising systems to attribute events using systems and methods for web-based advertising on personal devices.

These and other functions are described in further detail below.

Figure 1:
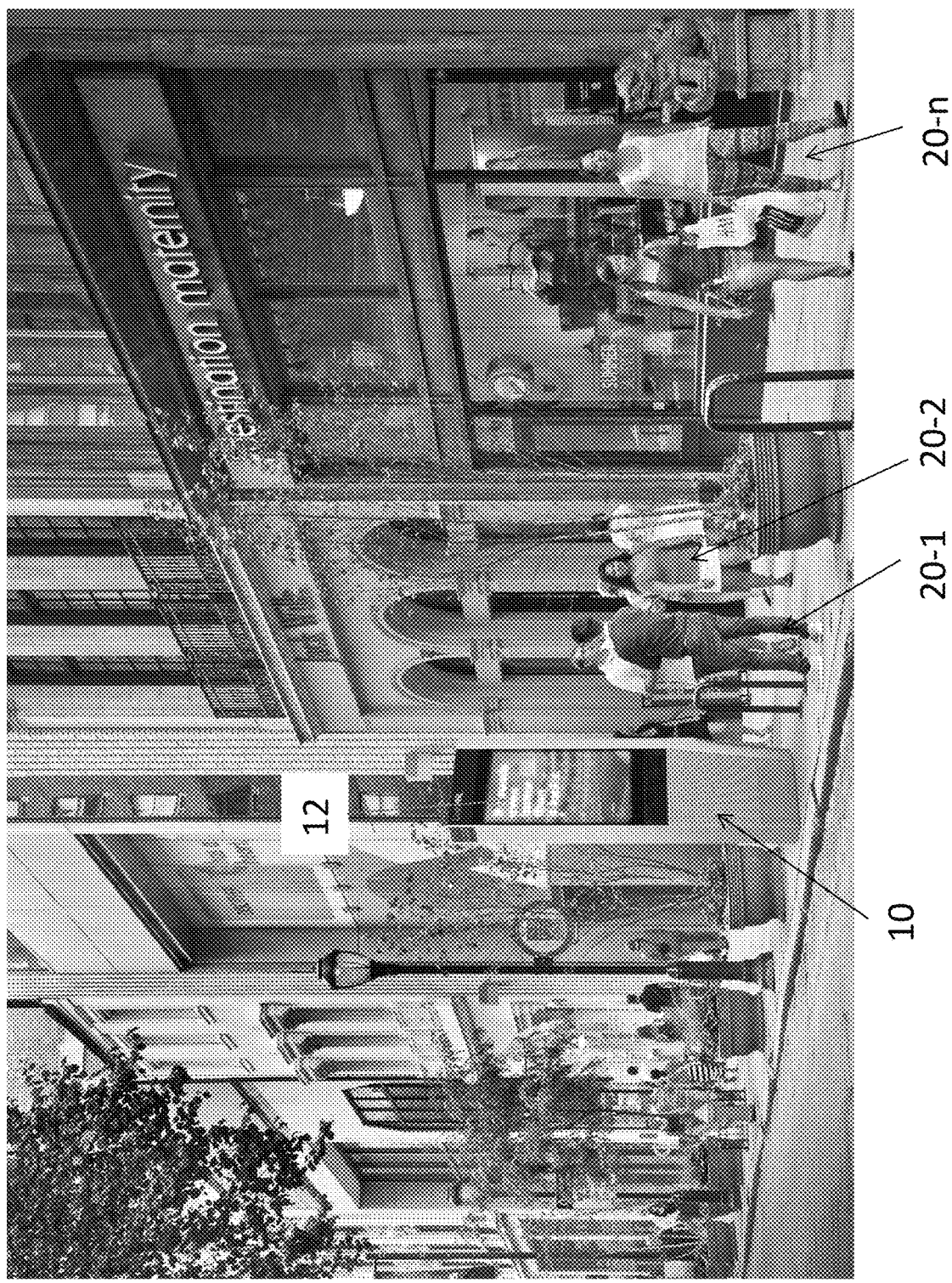
FIG. 1 illustrates an exemplary environment in accordance with exemplary embodiments of the present invention in which an electronic advertisement is displayed on a network-connected digital display system.

FIG. 1 illustrates an exemplary environment in accordance with the exemplary embodiments of the present invention in which a digital advertisement is displayed on a network-connected electronic display system 10. As shown, network-connected electronic display 10 is a non-personal device.

In practice, a digital advertisement is displayed on a monitor 12 of the electronic display system 10. During the time the digital advertisement is displayed, various individuals 20-1 . . . 20-n may be passing by the electronic display system 10 within viewing distance. Each individual 20-1 . . . 20-n may possess one or more personal devices 22-1 . . . 22-n, such as mobile phones, tablets, computers, to name a few, through which such individual may respond to the advertisement being displayed. In exemplary embodiments, the advertisement can include a unique response channel, such as a coupon code, a QR code, unique URL address, a unique call-tracking telephone number, a unique SMS short code, a unique social media hashtag, a unique email address, to name a few, by which the advertiser can determine if the response by an individual 20-1 . . . 20-n is attributable to an advertisement associated with the electronic display system 10 and/or the network associated with the electronic display system 10.

While FIGS. 1 and 3 (discussed below) illustrate an electronic display device 10 which is an outdoor display known as LinkNYC®, other non-personal network-connected electronic devices and displays can also be used in accordance with exemplary embodiments of the present invention. For example, network-connected screens placed in subway stations, building lobbies, elevators, on the exterior of motor vehicles, on seatbacks located in public transportation, retail kiosks, interactive displays, digital street signs, digital map/wayfinding displays, to name a few.

FIG. 2 illustrates an exemplary configuration of participant systems and platforms in accordance with exemplary embodiments of the present invention. It will be appreciated that each of the devices, systems and platforms illustrated in FIG. 2 are represented as a single unit, but may be comprised of one or more units consistent with embodiments of the present invention.

As illustrated in FIG. 2, one or more network-connected electronic display systems 10 may be connected via a network connection (such as the Internet) to distribution platform 30. Distribution platform 30 is, in turn, connected either directly or through a network connection (such as the Internet) to publisher ad server 40, which in turn is connected either directly or through a network connection (such as the Internet) to buyer demand side platform 50 (or DSP 50). In accordance with the exemplary embodiments, digital advertisements may be placed by advertisers using DSP 50 through publisher ad server 40 to be recorded via distribution platform 30 when displayed on electronic display system 10.

At any given period in time, an individual 20-1 . . . 20-n, who may possess one or more personal devices 22-1 . . . 22-n, such as mobile phones, tablets, computers, to name a few, may respond to a given digital advertisement being displayed on electronic display system 10.

In accordance with exemplary embodiments, events may be tracked by using an electronic action item, such as a coupon code, a QR code, unique URL address, a unique call-tracking telephone number, a unique SMS short code, a unique social media hashtag, a unique email address, to name a few.

In accordance with exemplary embodiments of the present invention, events can be tracked by displaying a unique quick response (QR) code in the digital advertisement and then having the communication service 80 provide the distribution platform 30 with tracking information each time the QR code is scanned and transformed by the consumer's personal device software into a web request, and collecting request information to help associate the event with a virtual session using attributes like: URL requested, requested IP address, cookies, user-agent, location of request, time of request, source network, or other meta data attached to the web request. The distribution platform 30 will then associate the request with a virtual session, and then emulate a browser making an event request to the buyer demand side platform 50 using the virtual session information as parameters or meta-data on the request.

In accordance with exemplary embodiments of the present invention, events can be tracked by displaying a unique coupon code in the digital advertisement and then having the communication service 80 provide the distribution platform 30 with tracking information each time the code is submitted to a website, mailed for a transaction, postal mailed, provided on a phone call, entered into an e-commerce transaction, provided during a retail transaction, or other redemption, to name a few. The distribution platform 30 will then associate the request with a virtual session, and then emulate a browser making an event request to the buyer demand side platform 50 using the virtual session information as parameters or meta-data on the request.

In accordance with exemplary embodiments of the present invention, events can be tracked by displaying in the digital advertisement a custom URL, which can track and redirect the personal device to an advertiser URL. In such an embodiment, the process of redirecting from a human-readable short format (e.g. link.nyc/advertiser) can be used to determine the event was triggered, and collect request information to help associate the event with a virtual session. The distribution platform 30 will then associate the request with a virtual session, and then emulate a browser making an event request to the buyer demand side platform 50 using the virtual session information as parameters or meta-data on the request.

In accordance with exemplary embodiments of the present invention, events can be tracked by displaying a unique call-tracking telephone number in the digital advertisement and then having a communications service 80 provide the distribution platform 30 with tracking information each time a call is received at the call-tracking telephone number.

In accordance with exemplary embodiments of the present invention, events can be tracked by displaying a unique SMS short code in the digital advertisement and then having the communication service 80 provide the distribution platform 30 with tracking information each time an SMS message is received using the short code associated with the digital advertisement. In embodiments, other forms of messaging such as MMS, or messenger apps can be used in lieu of SMS message.

In accordance with exemplary embodiments of the present invention, events can be tracked by displaying a unique social media hashtag (e.g., # Intersection) in the digital advertisement and then having the communication service 80 provide the distribution platform 30 with tracking information each time the hashtag is posted in social media. Exemplary social media systems can include Facebook, Instagram, Twitter, LinkedIn, to name a few.

In accordance with exemplary embodiments of the present invention, events can be tracked by displaying a unique email address in the digital advertisement and then having the communication service 80 provide the distribution platform 30 with tracking information each time such email address receives an email associated with the digital advertisement.

In accordance with exemplary embodiments of the present invention, events can be tracked using other information displayed in the advertisement that can be used to link the event to the impression.

Figure 3A:
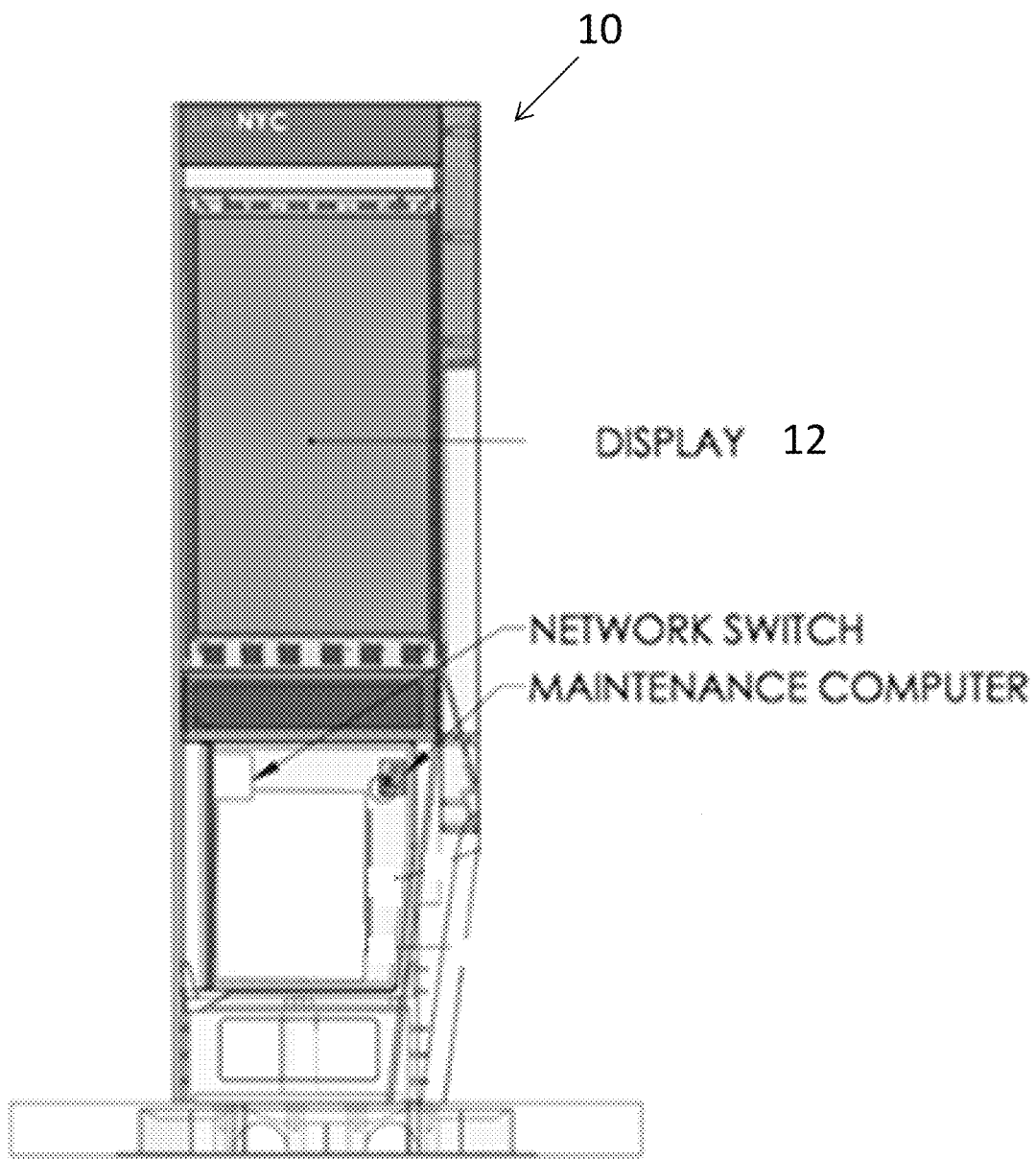
FIGS. 3A, 3B and 3C show front, side and back views of an exemplary electronic display system 10 that can be used in accordance with exemplary embodiments of the present invention.
Figure 3B:
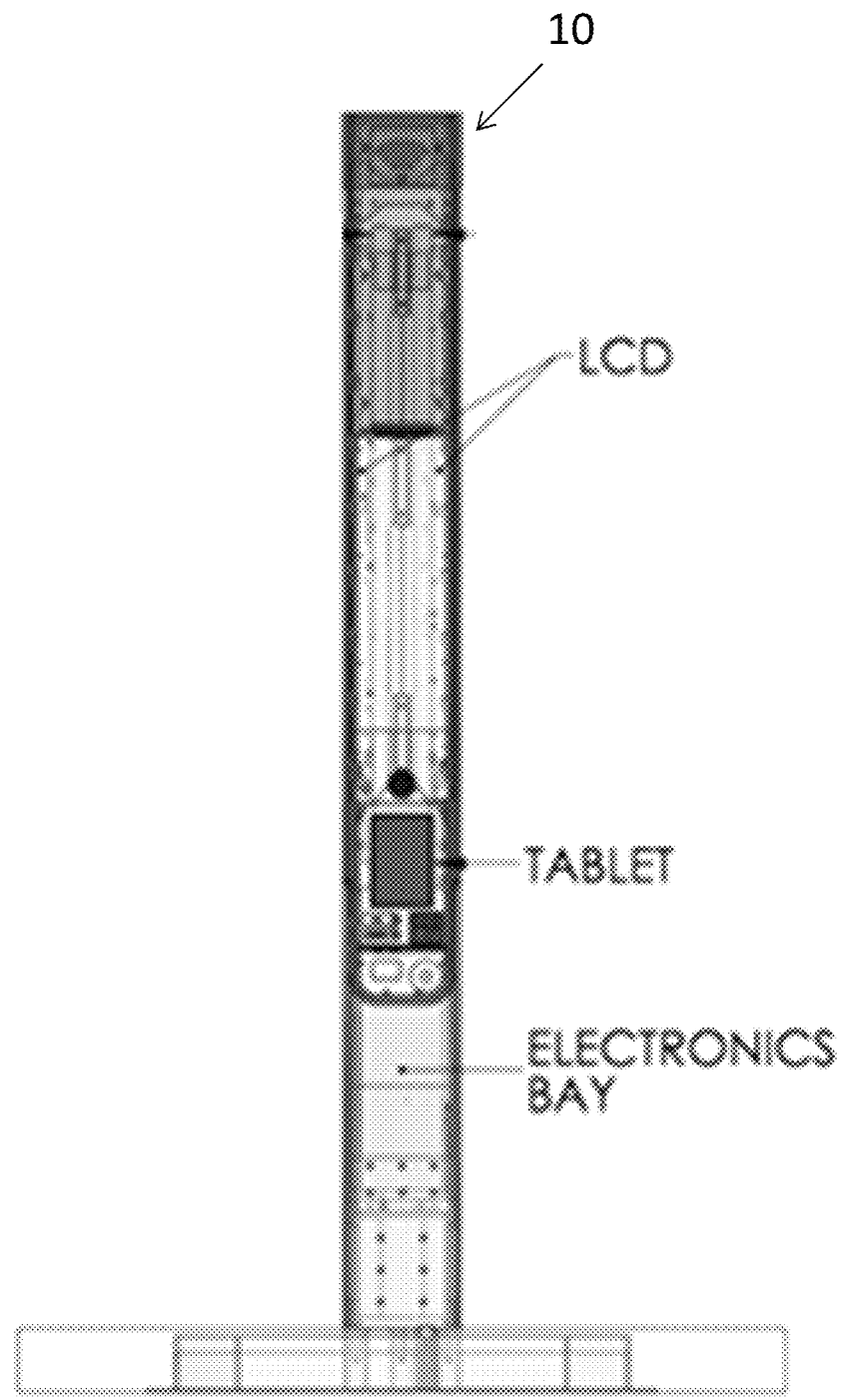
Figure 3C:
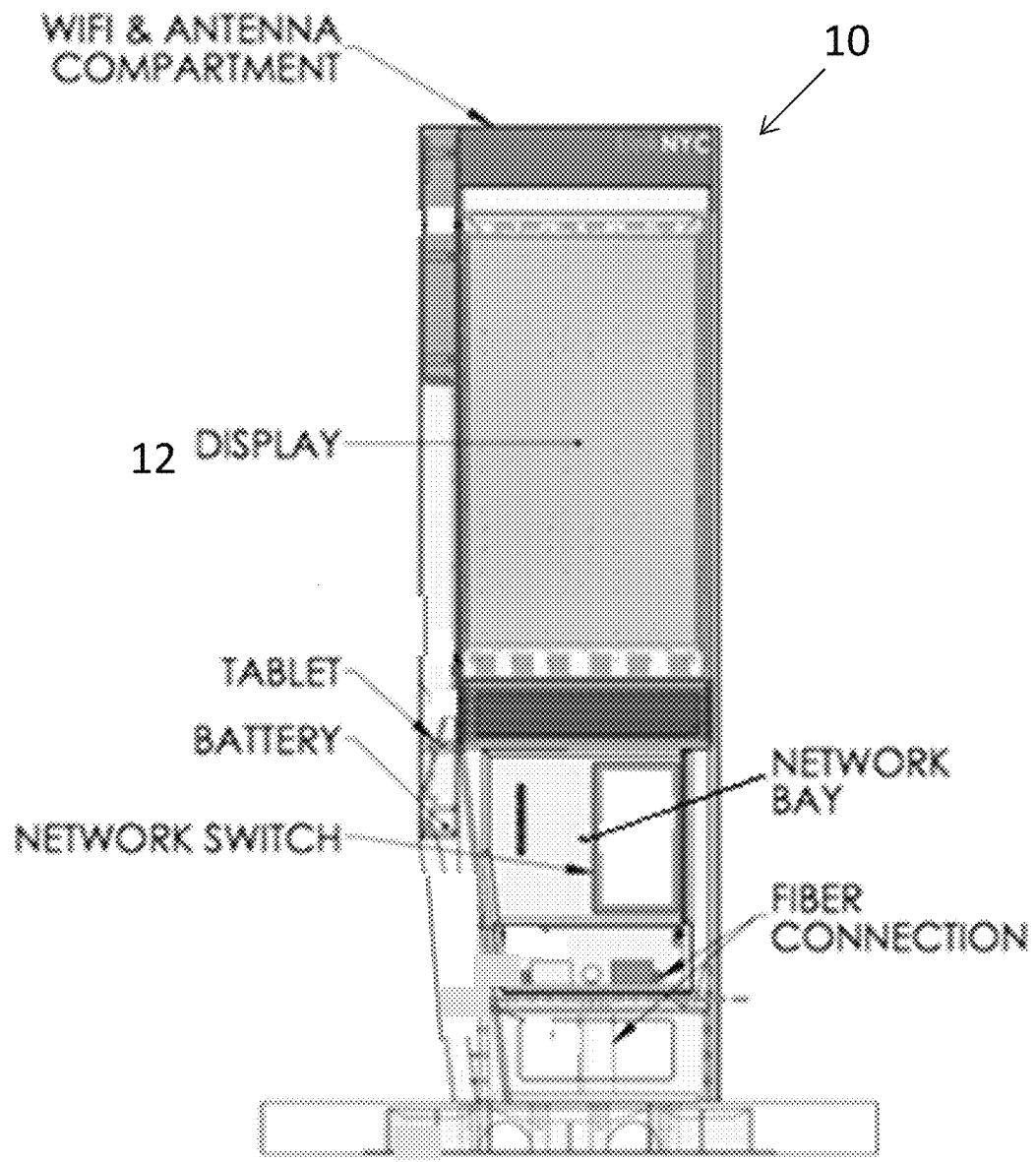

FIGS. 3A, 3B and 3C show front, side and back views, respectively, of an exemplary electronic display system 10 that can be used in accordance with exemplary embodiments of the present invention. As illustrated in FIGS. 3A-3C, electronic display 10 includes a display 12 on which the digital advertisement may be displayed. The electronic display 10 may also include a network connection, such as network switch and fiber connection as shown in FIG. 3C, by way of example. Other types of network connections such as cellular modem using GPRS, EDGE, 3G, 4G LTE, low power LTE, Ethernet, token-ring, Wi-Fi, WiMAX, Bluetooth, ZigBee, fixed-point wireless, mesh networks, or other data transmission technologies may also be used in accordance with exemplary embodiments of the present invention.

In embodiments, such as LinkNYC®, the electronic display 10 may offer other features such as an interactive screen, Wi-Fi or other wireless connections, electronic power, location "beacons" or information tagging, phone calling, emergency service access, display of non-advertising targeted information, video recording, audio recording, environmental condition recording to name a few. In embodiments where the electronic display 10 includes a tablet or other consumer-operated interactive capability, an event can be tracked and linked to an impression when the consumer responds via the tablet and a message is sent from the tablet the distribution platform 30 registering the event.

Figure 4:
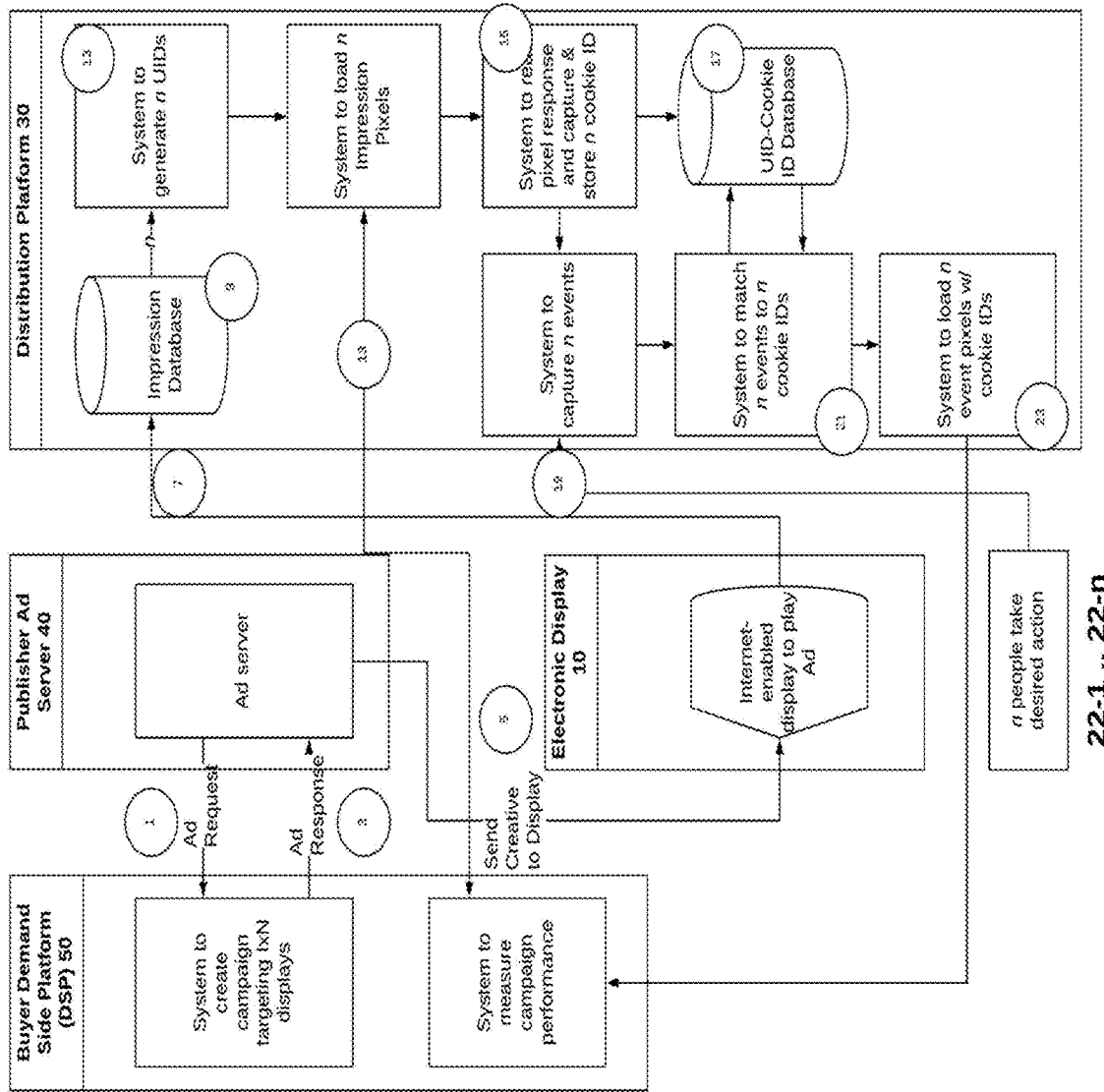
FIG. 4 illustrates a conceptual flow in accordance with exemplary embodiments of the present invention.

FIG. 4 illustrates a conceptual flow in accordance with exemplary embodiments of the present invention. In particular, FIG. 4 illustrates an exemplary process flow in accordance with exemplary embodiments of the present invention, involving buyer demand side platform 50, publisher ad server 40, electronic display(s) 10, distribution platform 30, and event transactions such as request from personal devices 22-1 . . . 22-n. Exemplary interaction among these devices will now be discussed.

In accordance with exemplary embodiments of the present invention, the process begins with a publisher ad server 40 and buyer demand side platform 50 receiving a request for an advertisement from one or more electronic displays 10 associated with an electronic display owner (Step S1 in FIG. 4). For purposes of illustration, the process will be described assuming a single electronic display 10, but it can be readily appreciated by those skilled in the art, that the same process may work with the same digital advertisement or corresponding digital advertisements being displayed on a plurality of electronic displays 10 associated with the same owner or operator. Similarly, while a single publisher ad server 40 and single DSP 50 is illustrated, it will be appreciated that multiple such servers could participate consistent with exemplary embodiments of the present invention.

An example of such advertisement placement process consistent with exemplary embodiments of the present invention can be initiated with a publisher ad server 40 hosted on an internet-connected server or cloud computing cluster uses a provided API to electronically send a bid request from a supply side platform (such as SSP 90 shown in FIGS. 5 and 6) to a buyer demand side platform 50 informing of the availability of an advertisement display opportunity on electronic display 10, and the buyer demand side platform 50 responding with a first digital advertisement (Step S3 in FIG. 4). Such a request will typically include information to allow a buying platform (such as DSP 50) to make a decision about which if any campaign it may wish to return with an electronic communication including, for example: purchase conditions (e.g. fixed pricing, auction-based pricing, exclusive availability) applicability of pre-negotiated terms or conditions "deals", time of display, location and/or orientation of device, categorization of device, resolution and orientation of display device, characteristics of the device's surrounding environment ("context") such as nearby points of interest, historical observations about the types of individuals ("audiences"), restrictions on content display, preferred language, to name a few. It will be appreciated by those skilled in the art that this process could be bilateral, asynchronous, and may be initiated by either the buyer demand side platform 50 or the publisher ad server 40 using either a single, or potentially multiple rounds of message exchange to arrive at a final advertising placement, in accordance with exemplary embodiments of the present invention. Once the campaign is electronically determined by the buyer demand side platform 50 and the publisher ad server 70, a digital advertisement is sent to electronic display 10 to be delivered in a defined time period (e.g., "first time period") (Step S5 in FIG. 4). This digital advertisement may include images, videos or other user-visible content, as well as meta-data related to the advertisement, such as, by way of example: tracking API endpoints for relaying recorded impressions and events, restrictions governing the display of content, identifiers for the content, campaign, advertiser, and/or other related information, to name a few (collectively, "creative metadata"). The digital advertisement will include an electronic action item to be displayed to allow events associated with such advertisement to be tracked as discussed in greater detail below. Examples of such electronic action item may include a coupon code, a QR code, unique URL address, a unique call-tracking telephone number, a unique SMS short code, a unique social media hashtag, a unique email address, to name a few.

In accordance with the "creative metadata" the digital advertisement is displayed at the electronic display 10, for the defined time period (e.g., date or day of week and time of day 0, defined frequency (e.g., 15 second intervals every 2 minutes, defined location (e.g., device 10 and 34th Street and Broadway in New York City), defined contextual criteria device located >300 ft from a school) for requested device (e.g., electronic display device with specific device id), to name a few.

Another example of such advertisement placement process in accordance with exemplary embodiments of the present invention involves initiation via electronically recording in the distribution platform 30 the criteria governing the display of an advertisement provided for future evaluation by the buying platform. Data points provided ("targeting") may include, by way of example: applicable timeframe, selected location, specific characteristics about the type of people to expose to advertising ("targeting"), budget, and how quickly to spend budget, to name a few. In this scenario, the DSP 50 does not directly make a decision for individual requests, but provides the information used to make that decision which is delegated to the publisher ad server 40 for specific determination to be made at a future date. The process of display once that decision is made would be identical to the previously described process, and this digital campaign information would include images, videos or other user-visible content, as well as meta-data related to the advertisement such as, by way of example: tracking API endpoints for relaying recorded impressions and events, restrictions governing the display of content, identifiers for the content, campaign, advertiser, and/or other related information, to name a few (collectively, "creative metadata") which would be used in the same manner as above to facilitate the electronic display of content.

With reference to the figures, a method in accordance with an exemplary embodiment of the present invention includes receiving, from a first electronic display 10 at a first location, by a distribution platform 30, first electronic ad play data comprising a first device identifier associated with the first electronic display 10 and a first time-stamp associated with a first digital advertisement displayed during a first time period at the first electronic display at the first location (e.g., Step S7 in FIG. 4). The distribution platform 30 stores on first non-volatile computer readable memory operatively connected to the distribution platform 30, the first electronic ad play data in an impression database (e.g., the "impression database" shown in FIG. 4, as shown at Step S9 in FIG. 4) stored on the first non-volatile computer readable memory. The distribution platform 30 determines a first number N of impressions associated with a number of individuals estimated to have viewed the first digital advertisement during the first time period at the first location (e.g., Step S11 in FIG. 4). For each of the N impressions, the distribution platform 30 performs the following steps: [1] obtaining, from non-volatile computer readable memory operatively connected to the distribution platform, an impression pixel tag as obtained from a buyer demand side platform 50 associated with the first digital advertisement (e.g., Step S13 in FIG. 4); [2] generating a virtual session identified by a UID associated with the impression; [3] sending, to the buyer demand side platform 50, an impression pixel call containing information associated with the virtual session; [4] receiving, from the buyer demand side platform 50, an impression identifier to recognize a device on future calls corresponding to the received impression pixel call (e.g., Step S15 in FIG. 4); and [5] storing the received impression identifier against the UID as associated with the virtual session (e.g., Step S17 in FIG. 4).

In an accordance with an exemplary embodiment, a first electronic event may be received at the distribution platform from a first personal device 22-n associated with a first individual responding to the advertisement (e.g., Step S19 in FIG. 4). The distribution platform 30 may attribute the first electronic event with a first impression by performing the following steps: [1] obtaining, from non-volatile computer readable memory operatively connected to the distribution platform, an event pixel tag as obtained from the buyer demand side platform 50 associated with the first electronic event; [2] matching the first electronic event with the first digital advertisement by comparing one or more of the following (e.g., Step S21 in FIG. 4): i) the first electronic event with an identifying code string associated with the first digital advertisement; ii) time of the first electronic event with the first time-stamp associated with the first digital advertisement; iii) location of the first personal device at time of the first electronic event with the first location of the first electronic display; iv) characteristics of the first electronic event and previously recorded impressions using statistical modeling. The distribution platform 30 then associates the matched first electronic event with the first impression, obtains, from non-volatile computer readable memory operatively connected to the distribution platform, a corresponding UID and virtual session, and transmits the event pixel tag with the corresponding stored information from the virtual session, including any impression identifier information previously received from the buyer demand platform, to the buyer demand side platform to record the first electronic event (e.g., Step S23 in FIG. 4).

The determination of the first number N of virtual impressions may be performed by accessing a geolocation database comprising geolocation data which identifies a number of estimated viewers for a specified location at a specified time of day for a specified day of week as an impression multiplier. The first ad play data may then be matched with the impression multiplier to identify the N number of impressions.

Alternatively, the determination of the first number N of virtual impressions may be performed by using sensors to estimate the number of viewers exposed by a specific device at a point in time as an impressions multiplier. The sensors may be associated with one or more of the following: network traffic, cameras, audio and pressure, as discussed above.

The first electronic event may be sent via a redirect from a custom URL before the personal device is sent to an advertiser URL.

The first electronic event may be received from a communication service indicating that a telephone call was made to a call-tracking telephone number associated with the advertisement.

The first electronic event may be from a communication service indicating receipt by an SMS sent to a number associated with the first electronic advertisement.

The first electronic event may be from a communication service indicating a social media post with a unique hashtag or other identifying label was made, associated with the first electronic advertisement.

The first electronic event may be from a computer system indicating an email was received at a unique designated email address, associated with the first electronic advertisement.

The first electronic event may be from a computer system indicating receipt of a unique coupon code associated with the first electronic advertisement.

The first electronic event may be from a computer system indicating receipt of a unique QR code associated with the first electronic advertisement.

The information associated with the virtual session may include one or more of the following: a virtual device-id, virtual user-agent, virtual location, virtual IP address, virtual credentials (shared secrets, identifiers, hashes, username/passwords, PKI credentials) and any other information that allows the distribution system to emulate a web browser or mobile device digitally sending tracking information with a buyer digital platform.

The impression identifier may include one or more of the following: cookies returned by buyer digital platform such as: DSP id, campaign id, visit history, displayed ad id, headers, caching control information, API response content, status code, and other information for identification and tracking returned by the buyer digital platform designed to be persisted by a web browser, API client, or other connected device.

The buyer demand side platform may be associated with one or more external advertises tags, and for each of the N impressions, the distribution platform repeats steps d)[1] through d)[5] for each of the one or more external advertiser tags.

Figure 5:
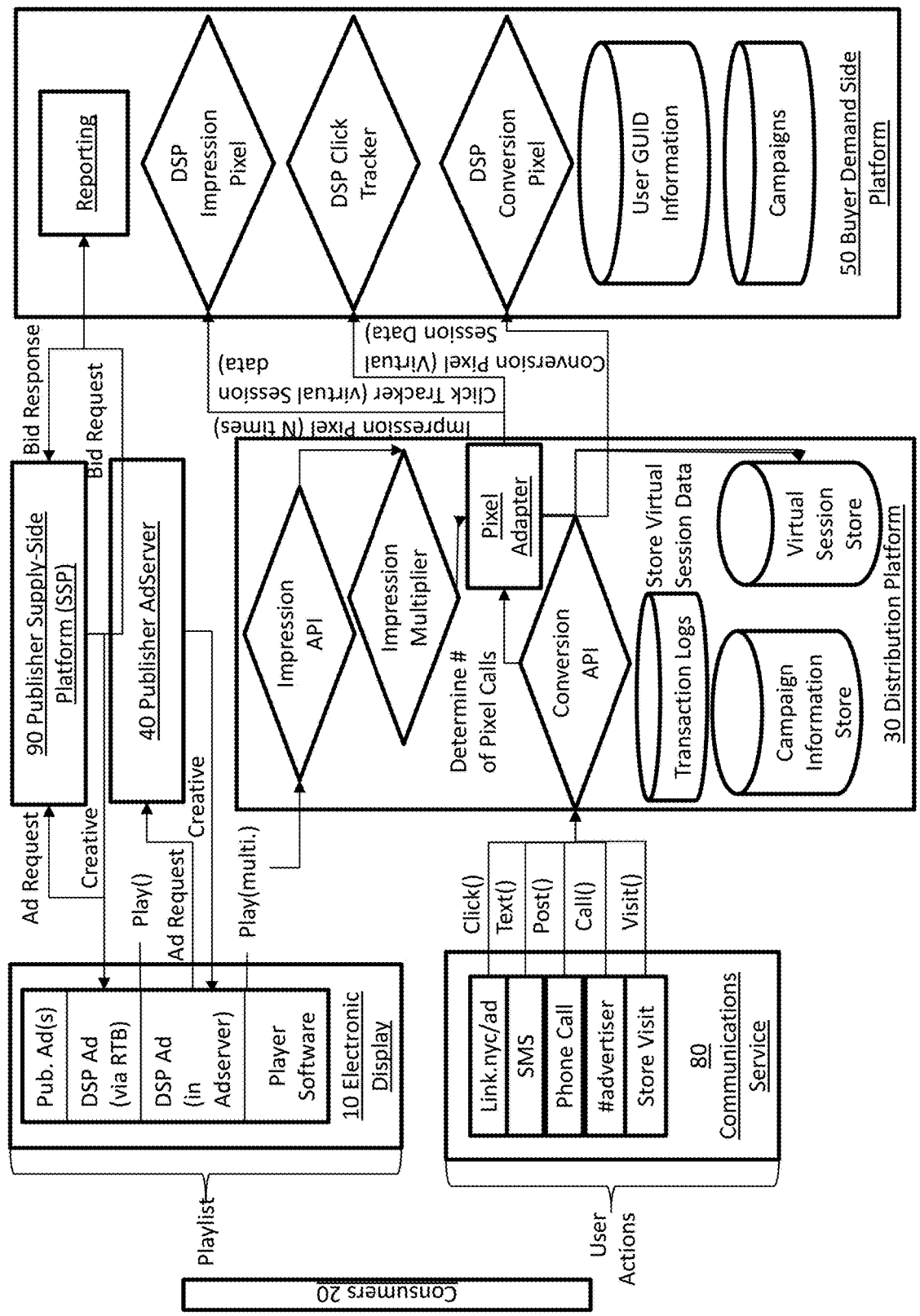
FIG. 5 illustrates a conceptual system flow of the systems used to convert physical responses into electronic information in accordance with exemplary embodiments of the present invention.

FIG. 5 illustrates a conceptual flow of the systems used to convert physical responses into electronic information in accordance with exemplary embodiments of the present invention.

Referring to FIG. 5, a digital advertisement ("ad") is scheduled in the electronic playlist on the electronic display 10 via either a pre-arranged campaign, or a real-time bidding (RTB) integration.

This ad, when played sends an electronic signal to the distribution platform 30—indicating the ad was played, and providing an "impression multiplier" estimating how many consumers (N number of consumers) were exposed to the ad.

The distribution platform 30 uses this information to determine how many impression records to create in the buyer demand side platform 50.

The distribution platform 30 creates a virtual session for each impression record. Then, mimicking a web browser, the distribution platform 30 issues a call to the buyer demand side platform 50 registering the impression, and receiving and recording any impression identifier information (cookies, headers, etc.) received into the virtual session from the buyer demand side platform 50.

Upon a user triggering an event via a number of communication channels 80, integration software is called which conveys the information into the distribution platform's 30 conversion API.

The distribution platform 30 uses an algorithm to use this information (such as personal device information, location, time, transaction identifiers like coupon codes, to name a few) and probabilistic modelling to associate the event with a previously recorded virtual session.

Using the information retrieved from the virtual session, the distribution platform 30 mimics a web browser, issuing a call to the buyer demand side platform 50 registering the conversion, replaying any stored impression identifier information (cookies, headers, to name a few) received into the virtual session.

This exemplary process allows the representation of both impressions on non-personal devices, and events to be recorded by the buyer demand side platform 50 in a way that enables electronic reporting designed for traditional advertising to reflect impressions and events mapping to non-personal device plays and consumer actions.

Figure 6:
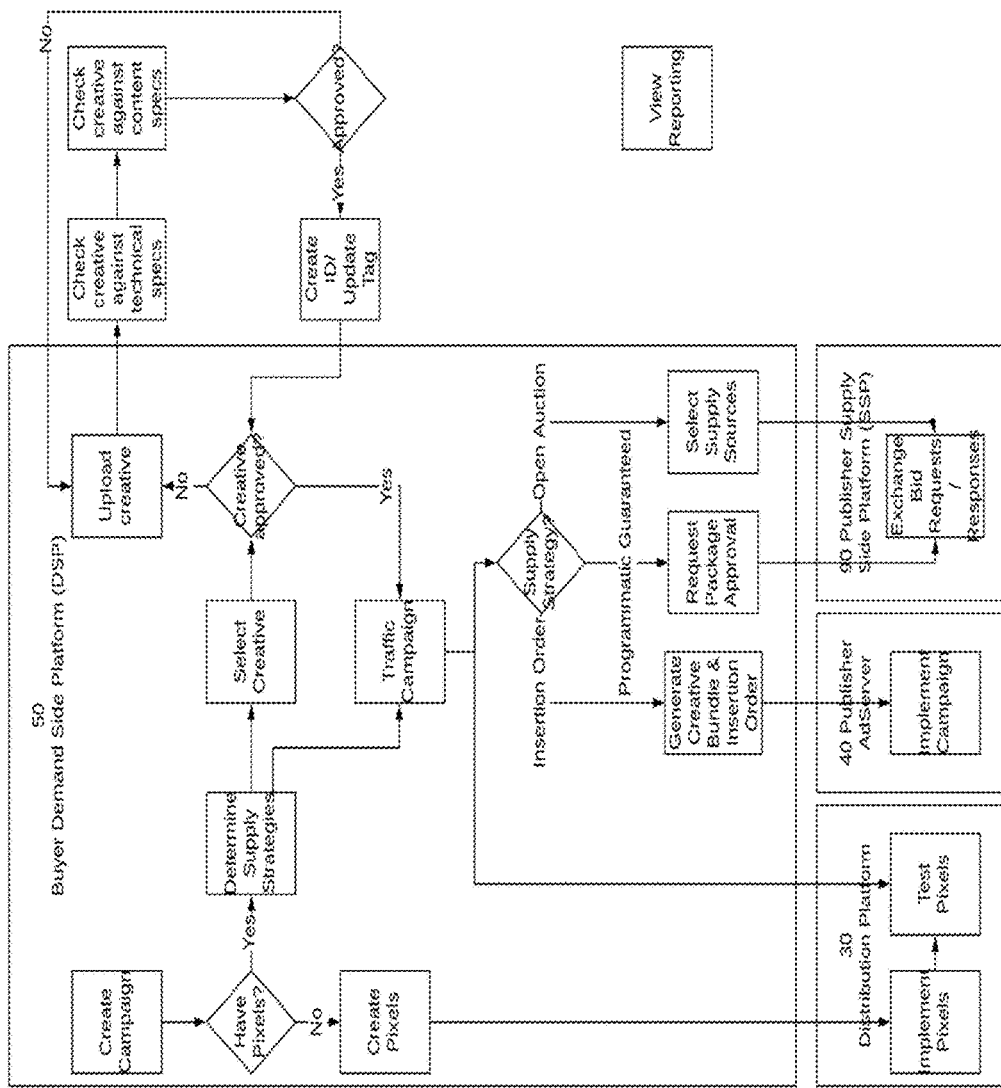
FIG. 6 illustrates an exemplary user process flow in accordance with exemplary embodiments of the present invention.

FIG. 6 illustrates an exemplary process flow in accordance with exemplary embodiments of the present invention.

Referring to FIG. 6, an advertising campaign is created at a buyer demand side platform 50. "Pixels" are then created at the demand side platform 50 which include computer code or API endpoint calls to track events that occur.

The pixels are sent to the distribution platform 30, where the pixels are entered after testing their implementation.

A creative asset (image, video, and/or some user-visible message format) is then selected for display in the advertising.

In embodiments, when a creative has not been previously approved, the creative may be uploaded into the buyer demand-side platform 50, where it may be reviewed for approval to be displayed on a electronic display 10.

In embodiments, advertiser may then determine a supply strategy and under what type of terms to purchase advertising inventory, which may then be electronically communicated. Examples of such terms, may include for example: pre-negotiated, implemented by executing in the electronic display owners ad server, pre-negotiated with individual transactions electronically exchanged via programmatic integration, non-guaranteed executing in real-time auctions over via programmatic integration, and/or another purchasing strategy, to name a few.

During and after the campaign has run, reporting provided by the demand-side platform 50, representing information collected by the demand-side platform from ad impressions and events, may be monitored.

EXAMPLES

The following examples of potential uses cases are for illustration purposes and not intended to be limiting.

Example 1

Advertising on Interactive Kiosks—when advertising is displayed on an interactive kiosk (serving as the electronic display) the kiosk software, ad sever, or advertising unit initiates the process of communicating with the distribution platform to allow for tracking of advertising in buyer demand systems.

Example 2

Advertising on Digital Billboards—when advertising is displayed on an digital billboard (serving as the electronic display) the content player software, ad server, or advertising unit initiates the process of communicating with the distribution platform to allow for tracking of advertising in buyer demand systems.

Example 3

Advertising on Digital Signage—when advertising is displayed on an connected device used for the display of signage or information (serving as the electronic display) the content player software, ad server, or advertising unit initiates the process of communicating with the distribution platform to allow for tracking of advertising in buyer demand systems.

Example 4

Advertising in automated retail machines (including vending machines)—when advertising is displayed on an automated retail information or transaction system (serving as the electronic display) the system software, ad server, or advertising unit initiates the process of communicating with the distribution platform to allow for tracking of advertising in buyer demand systems.

Example 5

Advertising on ATMs—when advertising is displayed on an ATM (serving as the electronic display) the system software, ad server, or advertising unit initiates the process of communicating with the distribution platform to allow for tracking of advertising in buyer demand systems.

Example 6

Cross-media advertising on campaigns spanning multiple channels—when advertising is delivered via multiple conventional digital media system (serving as the electronic display) the conventional digital media system software, ad server, or advertising unit initiates the process of communicating with the distribution platform to allow for the additional tracking of events on separate personal devices in buyer demand systems consistent with above usages.

Example 7

Advertising on digital displays in public building spaces (e.g., lobbies, reception of commercial or residential buildings)—when advertising is displayed on a public or semi-public display in a common building or outdoor area (serving as the electronic display) the system software, ad server, or advertising unit initiates the process of communicating with the distribution platform to allow for tracking of advertising in buyer demand systems. Such advertising may take place at transportation hubs or facilities, such as, for example, airports, train stations, train platforms, bus stations and taxi stands, to name a few. It should be appreciated that such advertising on non-personal devices may take place at any other type of public building space, such as, for example, gyms, bars, movie theaters, restaurants, grocery stores, departments stores, malls, convenience stores and gas stations, to name a few.

Example 8

Advertising in elevators—when advertising is displayed on a connected display in an elevator (serving as the electronic display) the system software, ad server, or advertising unit initiates the process of communicating with the distribution platform to allow for tracking of advertising in buyer demand systems.

Example 9

Advertising in non-personal vehicles: buses, taxis, ferries, trains, subways, airplanes—when advertising is displayed on screen located inside a vehicle for passengers, or on the outside of a vehicle for passers-by (serving as the electronic display) the system software, ad server, or advertising unit initiates the process of communicating with the distribution platform to allow for tracking of advertising in buyer demand systems.

Example 10

Advertising in retail checkout lines—when advertising is displayed on a connected display in a retail environment during the checkout process (serving as the electronic display) the system software, ad server, or advertising unit initiates the process of communicating with the distribution platform to allow for tracking of advertising in buyer demand systems.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method comprising:
   (a) receiving, from a first non-personal electronic display at a first public or semi-public location, by a distribution platform, first electronic ad play data comprising a first device identifier associated with the first non-personal electronic display and a first time-stamp associated with a first digital advertisement displayed during a first time period at the first non-personal electronic display at the first public or semi-public location;
   (b) storing, by the distribution platform on first non-volatile computer readable memory operatively connected to the distribution platform, the first electronic ad play data in an impression database stored on the first non-volatile computer readable memory;
   (c) determining, by the distribution platform, a first number N of impressions associated with a number of individuals estimated to have viewed the first digital advertisement during the first time period at the first public or semi-public location;
   (d) for each of the N impressions, performing by the distribution platform the following steps:
      [1] obtaining, by the distribution platform, from non-volatile computer readable memory operatively connected to the distribution platform, an impression pixel tag as obtained from a buyer demand side platform associated with the first digital advertisement;
      [2] generating, by the distribution platform, a virtual session identified by a unique session identifier (UID) associated with the impression;
      [3] associating, by the distribution platform, information with the virtual session, wherein the information allows the distribution platform to emulate a web browser or mobile device, wherein emulating a web browser or mobile device comprises digitally transmitting a proxy request including tracking information to the buyer demand side platform;
      [4] sending, by the distribution platform to the buyer demand side platform, an impression pixel call containing the information associated with the virtual session;
      [5] receiving, by the distribution platform from the buyer demand side platform, an impression identifier to recognize a device on future calls corresponding to the received impression pixel call; and
      [6] storing, by the distribution platform, the received impression identifier against the UID as associated with the virtual session;
   (e) receiving, at the distribution platform, from a first personal device associated with a first individual responding to the advertisement, a first electronic event;
   (f) attributing, by the distribution platform, the first electronic event with a first impression by performing the steps comprising:
      [1] obtaining, by the distribution platform from non-volatile computer readable memory operatively connected to the distribution platform, an event pixel tag as obtained from the buyer demand side platform associated with the first electronic event;
      [2] matching the first electronic event with the first digital advertisement by comparing one or more of the following:
         i) the first electronic event with an identifying code string associated with the first digital advertisement;
         ii) time of the first electronic event with the first time-stamp associated with the first digital advertisement;
         iii) location of the first personal device at time of the first electronic event with the first public or semi-public location of the first non-personal electronic display;
         iv) characteristics of the first electronic event and previously recorded impressions using statistical modeling;
      [3] associating, by the distribution platform, the matched first electronic event with the first impression;
      [4] obtaining, by the distribution platform, from non-volatile computer readable memory operatively connected to the distribution platform, a corresponding UID and virtual session; and
      [5] transmitting, by the distribution platform, a proxy request including the event pixel tag and the corresponding stored information associated with the virtual session, and including any impression identifier information previously received from the buyer demand platform, to the buyer demand side platform to record the first electronic event.

2. The method of claim 1, wherein in step (c), the determination of the first number N of virtual impressions is performed by the steps comprising:
   [1] accessing a geolocation database comprising geolocation data which identifies a number of estimated viewers for a specified location at a specified time of day for a specified day of week as an impression multiplier;
   [2] matching the first ad play data with the impression multiplier to identify the first number N.

3. The method of claim 1, wherein in step (c), the determination of the first number N of virtual impressions is performed by the steps comprising:
   [1] using sensors to estimate the number of viewers exposed by a specific device at a point in time as an impressions multiplier;
   [2] matching the first ad play data with the impression multiplier to identify the first number N.

4. The method of claim 3, wherein the sensors are associated with one or more of the following: network traffic, cameras, audio and pressure.

5. The method of claim 1, wherein in step (e), the first electronic event is sent via a redirect from a custom URL before the personal device is sent to an advertiser URL.

6. The method of claim 1, wherein in step (e), the first electronic event is received from a communication service indicating that a telephone call was made to a call-tracking telephone number associated with the advertisement.

7. The method of claim 1, wherein in step (e), the first electronic event is from a communication service indicating receipt by an SMS sent to a number associated with the first electronic advertisement.

8. The method of claim 1, wherein in step (e), the first electronic event is from a communication service indicating a social media post with a unique hashtag or other identifying label was made, associated with the first electronic advertisement.

9. The method of claim 1, wherein in step (e), the first electronic event is from a computer system indicating an email was received at a unique designated email address, associated with the first electronic advertisement.

10. The method of claim 1, wherein in step (e), the first electronic event is from a computer system indicating receipt of a unique coupon code associated with the first electronic advertisement.

11. The method of claim 1, wherein in step (e), the first electronic event is from a computer system indicating receipt of a unique QR code associated with the first electronic advertisement.

12. The method of claim 1, wherein in step (d)[3], the information associated with the virtual session comprises one or more of the following: a virtual device-id, virtual user-agent, virtual location, virtual IP address, virtual credentials (shared secrets, identifiers, hashes, username/passwords, PKI credentials) and any other information that allows the distribution system to emulate a web browser or mobile device digitally sending tracking information with a buyer digital platform.

13. The method of claim 1, wherein in step (d)[4], the impression identifier comprises one or more of the following: cookies returned by buyer digital platform such as: DSP id, campaign id, visit history, displayed ad id, headers, caching control information, API response content, status code, and other information for identification and tracking returned by the buyer digital platform designed to be persisted by a web browser, API client, or other connected device.

14. The method of claim 1, wherein the buyer demand side platform is associated with one or more external advertiser tags, and for each of the N impressions, the distribution platform repeats steps (d)[1] through (d)[5] for each of the one or more external advertiser tags.

* * * * *